Patented Dec. 25, 1934

1,985,769

UNITED STATES PATENT OFFICE 1,985,769

MANUFACTURE OF ALIPHATIC COMPOUNDS

Henry Dreyfus, London, England

No Drawing. Application July 29, 1930, Serial No. 471,597. In Great Britain September 6, 1929

8 Claims. (Cl. 260—116)

This invention relates to the manufacture of aliphatic acids from aliphatic alcohols and especially to the manufacture of acetic acid from ethyl alcohol.

According to this invention I produce aliphatic acids (and especially acetic acid) by passing the vapors of primary aliphatic alcohols (and especially ethyl alcohol vapor) in admixture with oxygen or a gas containing the same, such for instance as air, over or otherwise in contact with one or more of the hereinafter specified catalysts, at temperatures insufficiently high to produce acetone or other ketones in substantial quantity.

The catalysts I employ are those comprising a metal more electro-negative than magnesium, magnesium being considered an earth alkali metal, i. e. catalysts comprising either:—

(a) One or more metallic oxides (including the various oxides of metals which have oxides of various degrees of oxidation)—and particularly oxides of metals the acetates of which yield acetic acid on heating or by reaction with water or steam under the action of heat (e. g. oxides of manganese, cobalt, nickel, iron, zinc, lead, uranium)—including mixtures of two or several of such oxides whether of similar or dissimilar metals but excluding the use of one or more alkali or alkali earth oxides alone, or, (b) One or more of the metallic oxides of (a) above in admixture with:—one or more alkali, or, preferably alkali earth oxides, hydroxides or salts such as carbonates or other salts and especially salts of less strong acids such for instance as silicates or borates, or, (c) Instead of the metallic oxides of (a) above there may be used, alone or in admixture with the alkali or alkali earth oxides, hydroxides or salts of (b) above, and/or in admixture with the metallic oxides of (a) above, other compounds of the metals, e. g. carbonates or even the metals themselves. Preferably however when free metals are employed they are employed in admixture with the oxides of (a) above in presence or absence of the alkali or alkali earth compounds of (b) above.

In performing the invention I preferably employ one or more of the oxides of (a) above, and especially one or more oxides of metals the acetates of which yield acetic acid on heating or by reaction with steam or water under the action of heat, as the catalyst. For instance, I may employ a catalyst composed of one or more of the following oxides:—copper oxide, one or more iron oxides (e. g. ferric oxide), cobalt oxide, one or more oxides of manganese (e. g. manganese dioxide), one or more oxides of lead or uranium. Aluminium oxide is another instance of a metallic oxide which may be employed for the purposes of the invention.

The catalysts may, if desired, be employed spread upon, or deposited upon or mixed with filling or contact materials such for instance as pumice, kieselguhr or the like.

The temperature at which the reaction is to be performed varies to some extent with the catalyst or catalysts and conditions employed. Generally the reaction may be performed at temperatures between about 150° C. and 400° C. and especially between about 200° and 350° C. When the catalyst comprises one or more alkali earth or alkali compounds it is advisable to use somewhat lower temperatures in order to avoid formation of ketones, for instance in such cases it is advisable to use temperatures not exceeding about 300° C., e. g. temperatures between about 150° and 300° C. As above stated the temperature must always be insufficiently high to cause the formation of substantial quantities of acetone or other ketones.

The reaction may be performed under any desired pressure, whether higher or lower than normal atmospheric, for instance under normal atmospheric pressure, or under reduced pressure or "vacuum", or under increased pressure such for example as under 3 to 10 atmospheres or more.

For the purpose of the invention I preferably employ mixtures of alcohol vapor and oxygen (or air or other gaseous mixture containing oxygen) containing more than one molecule of oxygen relatively to each molecule of the alcohol, whether or not water vapor or humidity is present in the mixture, or even containing substantially large proportions of oxygen e. g. from 2 to 10 or more parts by volume of oxygen relatively to each volume of alcohol.

I preferably perform the reaction in presence of water vapor or steam, as such water vapor or steam facilitates the decomposition to free acid of aliphatic acid salts (e. g. acetates) which may be formed intermediately. Further, by varying the quantity of water vapor or steam employed the concentration of the aliphatic acid produced may be varied at will.

I preferably add the water vapor or steam to the mixture of alcohol vapor and oxygen (or gas containing the same) prior to passing the said mixture over or otherwise in contact with the catalyst, and I preferably add relatively large amounts of steam or water vapor to said mixture, e. g. amounts such as 2 to 10 or more times the volume of the alcohol vapor present in the mixture. If desired, vapors of the aliphatic acid to be produced may be added to the mixture of alcohol vapor and oxygen (or gas containing the same) prior to passing said mixture over or otherwise in contact with the catalysts, whether or not said mixture contains water vapor or steam. By varying the quantity of aliphatic acid vapor and/or water vapor or steam added to the mixture of alcohol vapor and oxygen (or gas containing the same), the concentration of the aliphatic acid produced by the process may be varied at will.

The mixture of alcohol vapor and oxygen (or gas containing the same), whether or not containing steam or water vapor, or aliphatic acid vapor, may be submitted to the reaction in any convenient way. As for instance the mixture may be passed in a rapid stream through a tube or other form of apparatus (e. g. a tube or other form of apparatus of copper, iron, "Staybrite", silicaware, earthenware or the like) filled or provided with the catalyst and heated to the desired temperature.

The following example illustrates a convenient form of execution of the invention, but it is to be understood that it is in no way limitative.

*Example*

A mixture of ethyl alcohol, oxygen and steam, in about the proportions 1:3:5 by volume, is passed through a tube (e. g. of copper) or other form of apparatus filled or provided with the catalyst, for example ferric oxide, and maintained at a temperature of about 280–320° C. There results a copious yield of acetic acid, which can be separated by fractional distillation, if desired, from unchanged ethyl alcohol, water, or any by-products formed in the reaction.

If a catalyst is employed which contains alkali or earth alkali metals, such for example as a catalyst comprising a mixture of ferric oxide and calcium carbonate (e. g. a mixture containing two molecular equivalents of ferric oxide to one of calcium carbonate), lower temperatures e. g. about 230° to 280° C. should be maintained.

What I claim and desire to secure by Letters Patent is:—

1. Process for the manufacture of an aliphatic acid, which comprises subjecting the vapor of a primary aliphatic alcohol to reaction with free oxygen in the proportion of at least one molecule of oxygen to each molecule of alcohol in presence of a catalyst mass comprising essentially a compound of an alkaline earth metal and a compound selected from the group consisting of oxides, hydroxides and carbonates of metals whose acetates may be thermally decomposed to yield acetic acid, at a temperature insufficiently high to produce substantial quantities of ketone and lying between 150° and 300° C.

2. Process for the manufacture of acetic acid, which comprises subjecting a mixture of ethyl alcohol vapor and free oxygen in the proportion of at least one molecule of oxygen to each molecule of alcohol to reaction in the presence of a catalyst mass comprising essentially a compound of an alkaline earth metal and a compound selected from the group consisting of oxides, hydroxides and carbonates of metals whose acetates may be thermally decomposed to yield acetic acid, at a temperature insufficiently high to produce substantial quantities of acetone and lying between 150° and 300° C.

3. Process for the manufacture of an aliphatic acid, which comprises subjecting a mixture of a primary aliphatic alcohol and free oxygen in the proportion of at least one molecule of oxygen to each molecule of alcohol to the action of a temperature insufficiently high to produce substantial quantities of ketone and lying between 150° and 400° C. in presence of a catalyst mass composed of ferric oxide.

4. Process for the manufacture of acetic acid, which comprises subjecting a mixture of between 2 and 10 volumes of oxygen and 1 volume of ethyl alcohol vapor to reaction in presence of a catalyst mass comprising essentially a compound of an alkaline earth metal and a compound selected from the group consisting of oxides, hydroxides and carbonates of metals whose acetates may be thermally decomposed to yield acetic acid, at a temperature insufficiently high to produce substantial quantities of acetone and lying between 150° and 300° C.

5. Process for the manufacture of acetic acid, which comprises subjecting a mixture of the vapor of ethyl alcohol and free oxygen in the proportion of at least one molecule of oxygen to each molecule of alcohol to a temperature insufficiently high to produce substantial quantities of acetone and lying between 150° and 400° C. in presence of a catalyst mass composed of ferric oxide.

6. Process for the manufacture of acetic acid, which comprises subjecting a mixture of between 2 and 10 volumes of oxygen and 1 volume of ethyl alcohol to the action of a temperature insufficiently high to produce substantial quantities of acetone and lying between 150° and 400° C. in presence of a catalyst mass composed of iron oxide.

7. Process for the manufacture of acetic acid, which comprises subjecting a mixture of between 2 and 10 volumes of oxygen and 1 volume of ethyl alcohol to the action of a temperature between 280° and 320° C. in presence of a catalyst mass composed of ferric oxide.

8. Process for the manufacture of acetic acid, which comprises subjecting a mixture of between 2 and 10 volumes of oxygen and 1 volume of ethyl alcohol to the action of a temperature between 230° and 280° C. in presence of a catalyst mass composed of ferric oxide and calcium carbonate.

HENRY DREYFUS.